United States Patent [19]

Greenwood

Best Available Copy

[11] E Re. 30,299

[45] Reissued Jun. 10, 1980

[54] GYROSCOPE TOY

[75] Inventor: Donald Greenwood, Akron, Iowa

[73] Assignee: Ideal Toy Corporation, Hollis, N.Y.

[21] Appl. No.: 696,158

[22] Filed: Jun. 14, 1976

Related U.S. Patent Documents

Reissue of:

[64] Patent No.: 3,650,067
Issued: Mar. 21, 1972
Appl. No.: 879,157
Filed: Nov. 24, 1969

U.S. Applications:

[63] Continuation of Ser. No. 549,284, Feb. 12, 1975, abandoned.

[51] Int. Cl.[2] ..... A63H 17/00

[52] U.S. Cl. ..... 46/206; 46/209

[58] Field of Search ..... 46/49, 50, 206, 209

[56] References Cited

U.S. PATENT DOCUMENTS

| | | | |
|---|---|---|---|
| 2,595,374 | 5/1952 | Studt | 46/49 |
| 2,788,613 | 4/1957 | Gelfand et al. | 46/209 X |
| 2,829,467 | 4/1958 | Pagano | 46/209 |
| 2,873,553 | 2/1959 | Ullman | 46/209 |
| 3,237,342 | 3/1966 | Bross | 46/206 X |
| 3,628,285 | 12/1971 | Murakami | 46/50 |

FOREIGN PATENT DOCUMENTS

| | | | |
|---|---|---|---|
| 747034 | 3/1956 | United Kingdom | 46/209 |

*Primary Examiner*—Louis G. Mancene
*Assistant Examiner*—Robert F. Cutting
*Attorney, Agent, or Firm*—Richard M. Rabkin

[57] ABSTRACT

Friction driven toys including a gyroscopic stabilizing element.

13 Claims, 12 Drawing Figures

GYROSCOPE TOY

Matter enclosed in heavy brackets [ ] appears in the original patent but forms no part of this reissue specification; matter printed in italics indicates the additions made by reissue.

*This is a continuation of application Ser. No. 549,284, filed Feb. 12, 1975, now abandoned.*

BACKGROUND OF THE INVENTION

This application relates to toys and more particularly, to friction driven toys having a unique gyroscopic stabilizing element.

Two- and four-wheeled toys enjoy vast acceptance in the consumer market. Such toys, when friction driven, enjoy even better acceptability because of their self-driving capabilities. Frequently though, these toys tend to be unstable in performance. With the common four-wheel toys, the toy's motion is fairly predictable with the toy generally moving in one direction on all four wheels. This can tend to bore a child while variety in the direction of motion of the four-wheel toy will enhance its appeal to children, particularly the toddler and grammar school age groups.

To overcome the instability of one-, two-, and four-wheel toys, gyroscope stabilizing elements have been employed. However, these elements are generally employed with pull cord type drive means where a pull cord is wrapped around the shaft of the gyroscope and prior to the toy's movement, the cord is pulled. As may be well-understood, this type of drive means has many disadvantages. For instance, the detailed type manual manipulation required to wind the cord around the shaft and then pull it is often too difficult for younger children to execute, and, therefore, gyroscopic toys when equipped with pull cord type drive means find relatively poor acceptance in the consumer market. Moreover, pull cords readily lend themselves to being lost since they are not physically a permanent attachment to the toy.

Friction driven toys generally comprise an energy storing element or flywheel which is rotated upon rotation of a drive wheel, generally being the front or rear wheels of the toy. The transmission drive mechanism between the drive wheel and flywheel is such as to cause energy to be stored in the flywheel and after the drive wheel is initially rotated and the toy is placed on a surface, the toy is propelled by the energy stored in the rotating drive wheels. In the prior art, a stabilizing gyroscope element has been employed with a four-wheel device which is friction driven, but is located well above the center of gravity of the toy. While the stability of the toy is somewhat enhanced, it is not enhanced enough to enable the toy to perform relatively unusual, complex, and attractive maneuvers. Therefore, the prior art friction driven toy including a stabilizing gyroscope element generally approximates in performance a standard four-wheel toy whose motion is relatively predictable and "unexciting."

As is well known, toys appeal to children for many reasons, one of which includes visual perception of moving mechanisms as the toy operates. In the prior art, the motion of friction driven gyroscopic elements is hidden from the view of the child. Such a rotating movement by a relatively large member, such as the gyroscope, would be relatively attractive to the child.

Accordingly, it is a principle object of the present invention to provide an improved toy.

Another object of the present invention is to provide a toy capable of various maneuvers.

Still another object of the present invention is to provide a toy which is relatively attractive in appearance and sturdy in operation.

Another object of the present invention is to provide a toy whose motion is somewhat different from a conventionally wheeled vehicle and is self-driven.

Still another object of the present invention is to provide a toy including a gyroscope stabilizing element capable of being easily rotated.

Another object of the present invention is to expose interesting rotating surfaces to enable them to be viewed by a child.

Still another object of the present invention is to provide a two- or four-wheel toy which is relatively simple to operate.

Another object of the present invention is to improve the stability to two- and four-wheel toys while in motion yet increasing the variety of interesting maneuvers obtainable with such toys.

Other objects, advantages, and features of the present invention will be made more apparent from the following description.

SUMMARY

In accordance with the principles of the present invention, there is provided a friction driven type toy comprising a housing and at least two wheels with at least one of the wheels being a drive wheel, the toy including at least one front and one rear wheel, the drive wheel coupled to an energy storing means and a gyroscope means, with the energy storing means and the gyroscope means being capable of storing energy upon rotational movement of the drive wheel and support means connected to the housing to connect at least the gyroscope means between the front and rear wheels. As contrasted with the prior art type of friction driven toy including a gyroscope, the gyroscope element of the present invention located between the front and rear wheels of the toy permits it to be located extremely close to the toy's center of gravity. In the prior art device, the gyroscope element is located above the rear wheels which is necessarily a significant distance from the center of gravity of the toy. It has been found that a toy car constructed in accordance with the principles of the present invention is capable of numerous complex, different, and attractive maneuvers not otherwise attainable with the prior art device. In particular, a four-wheel car can be made to stand on either end and rotate thereabout, or run on two wheels and then right itself and continue on four wheels.

The present invention utilizes a weighted flywheel as both the energy storing and gyroscopic means. In one embodiment thereof, namely a four-wheel car, the flywheel is disposed substantially horizontally in a plane parallel to the plane of the wheels. Otherwise stated, the axis of the flywheel is perpendicular to the longitudinal axis of the vehicle. Locating the flywheel between the front and rear wheels, as aforesaid, offers the further advantage in that it may thereby be located at the bottom of the toy and thus be made visible by providing a viewing means, such as a transparent window. In addition, the exposed surface of the flywheel may be multicolored or variously decorated such as in the form of a spiral so that its visible rotation offers added attractiveness and enhances its play appeal. Thus, a toy car or other wheeled vehicle constructed in accordance with the principles of the present invention may serve not only as a wheeled vehicle but also as an interesting and attractive rotational or gyroscopic element.

A gyroscopic element serves to stabilize the motion of a toy because as is well known in the art, the gyroscope or any rotating body tends to maintain a fixed axis of rotation. With a gyroscope or flywheel rotating at a given speed, a toy car embodying the principles of the invention, is self-supporting on either its front or rear end and it will rotate thereabout. It may be well understood that such a rotational movement of a car upon either of its ends is extremely attractive to a child. Further, a car constructed in accordance with the principles of the present invention will thereafter when righting itself, exhibit widely diverse characteristics such as moving on only two wheels in regard to its motion and such action is extremely attractive from that viewpoint.

Some other embodiments illustrating the principles of the present invention are shown in the following description. In particular, a motorcycle may be provided with a gyroscopic element located between the front and rear wheels in a generally vertical direction and may suitably be driven by the rear wheel. Such a location for the gyroscope enhances the stability of a two-wheeled motorcycle device, and enables it to perform maneuvers in a forward direction for some distance on the rear wheel only. By encasing the gyroscopic element of the motorcycle in a transparent housing, its motion, when the gyroscope is multi-colored, is extremely attractive to the child and enhances its appeal.

In order to provide durability for a toy constructed in accordance with the principles of the present invention, relatively durable material such as plastic are suitable. The flywheel, which serves as the gyroscope, should be weighted or comprise a material having greater density than that utilized for the housing of the toy. Generally, metal is employed for the flywheel.

DESCRIPTION OF THE PREFERRED EMBODIMENT

Figure 5:
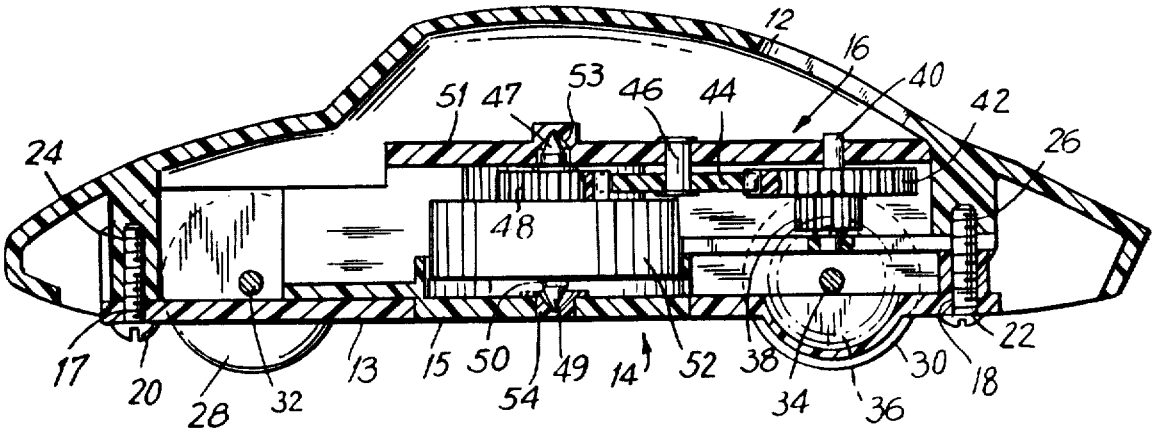
FIG. 5 is a side elevational view in cross section of the toy car of FIG. 4 taken generally along the lines 5—5 thereof.
Figure 6:
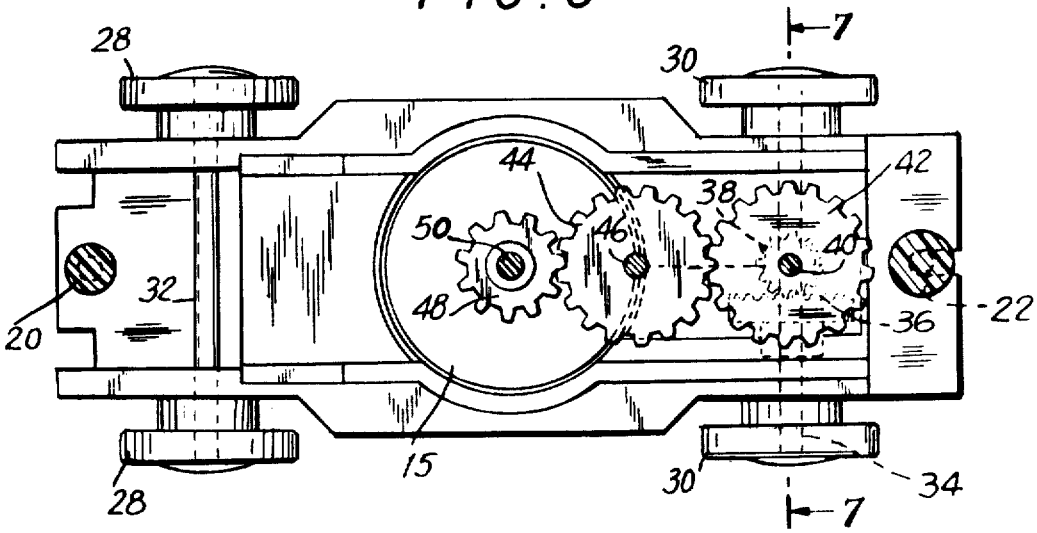
FIG. 6 is a bottom plan view of the car shown in FIG. 5 with the bottom cover removed.
Figure 7:
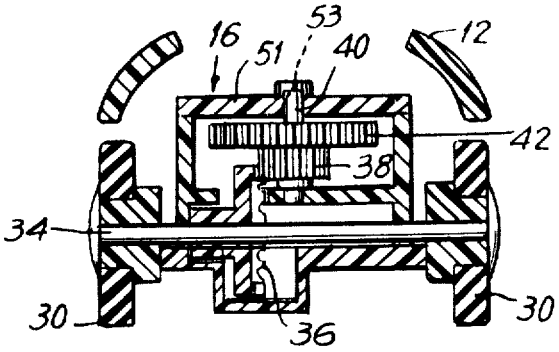
FIG. 7 is a cross-sectional view of the toy car of FIG. 6 taken generally along the lines 7—7 thereof.

In order to understand the principles of the present invention, FIGS. 5 and 6 which illustrate the operative functional elements of the toy car of the present invention will first be described. The car basically comprises two members: a toy housing or shell member 12 and a bottom chassis portion 14. The top housing 12 generally comprises the hood, trunk and main body portions of a replica automobile, while the bottom chassis portion 14 comprises a bottom 13, having preferably a circular viewing window 15, wheels and a drive mechanism for the toy car. The top housing 12 may suitably be fabricated of a durable plastic material. If desired, the top housing 12 can be colored to enhance its attractiveness. The bottom portion 14 generally comprises a gear box 16 housing the gearing members of the drive mechanism previously described. The gear box 16 may be suitably molded to efficiently hold and protect the operative working members of the drive mechanism of the toy car. Apertures, such as the pair of holes 17 and 18 are provided in the bottom portion 14 of the front and rear areas of the car to accommodate fasteners, such as screws 20 and 22 threaded into corresponding recesses 24 and 26, respectively, in the top housing portion 12. Only one fastener may also be employed where one end of the bottom portion 14 is simply "hooked" in place, or the bottom portion 14 can readily be snapped into place without use of any fasteners.

The car comprises a pair of front wheels 28 and a pair of rear wheels 30. Front wheels 28 are connected to and rotate with an axle or shaft 32 which has wheels 28 connected on each end while wheels 30 are connected to and rotate with an axle or shaft 34. Rear wheels 30 preferably serve as the drive wheels for the friction toy of the present invention. In particular, when shaft 34 rotates by spinning the rear wheels 30, a crown or bevel gear 36 fixedly mounted on shaft 34 also rotates. A pinion gear 38 fixedly mounted on a suitable rotatively supported shaft 40 meshes with gear 36. Gear 42, larger in diameter than pinion gear 38, is also fixedly mounted on shaft 40 so as to rotate when pinion gear 38 rotates. Gears 38 and 42 which form part of the overall gear train may suitably be integrally formed together. Gear 42 in turn meshes with an idler gear 44, which is mounted on a suitable rotatively supported shaft 46. Gear 44 meshes with another pinion 48, which rotates about a shaft 50. Gears 42 and 38 are located towards the rear of the car, while gears 44 and 48 are located towards the front of the car with respect to gear 42. A flywheel 52 is fixedly connected to and also rotates with shaft 50. Flywheel 52 serves both as the inertia (energy storing means) and gyroscopic element of the toy car shown in FIGS. 5 and 6. The ends of shaft 50 are preferably tapered or conical in form (47 and 49) and retained for rotation in corresponding conical shaped bearing recesses provided in the chassis. The top wall 51 of gear box 16 is provided preferably with an integrally formed conical bearing recess 53 for seating the conical end 47 of shaft 50, while the conical end 49 is seated in a suitable conical bearing insert 54 provided on the upperside of the bottom chassis portion 14. In this manner, flywheel 52 is located between the shafts 32 and 34 near the bottom of the toy and in close proximity to its center of gravity. Such a position is critical in that it enables the toy car to execute various maneuvers. Of course, the conical bearing recess for the bottom end of the shaft 50 could also be made integral with the viewing window 15.

Figure 2:
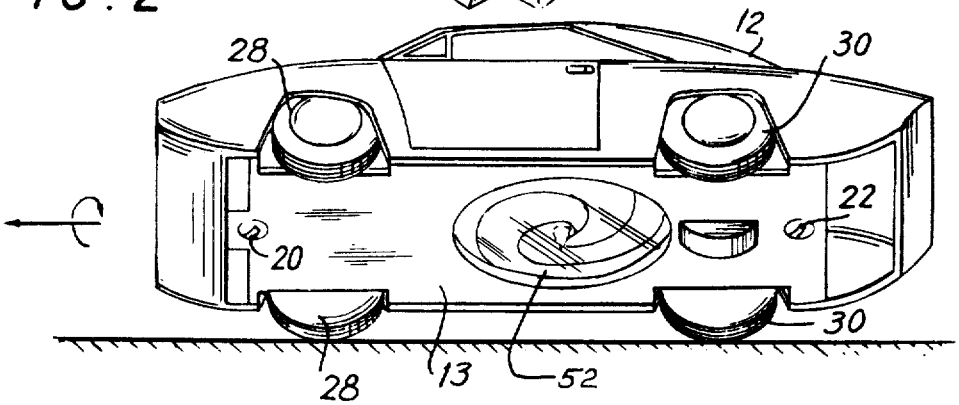
FIG. 2 is a bottom perspective view of a toy car constructed in accordance with the principles of the present invention moving on only two wheels.
Figure 3:
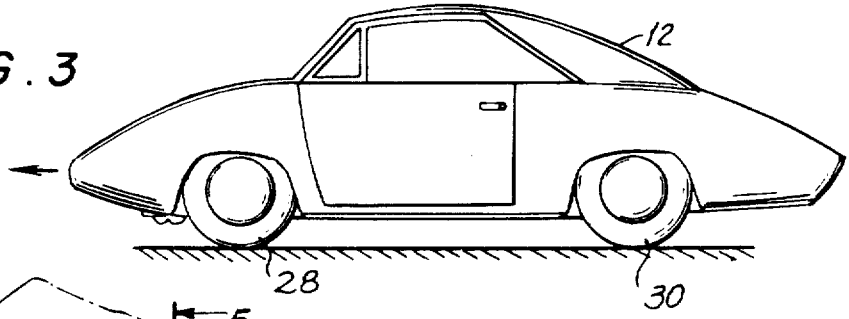
FIG. 3 is a side elevational view of a toy car constructed in accordance with the principles of the present invention moving on all four wheels.
Figure 4:
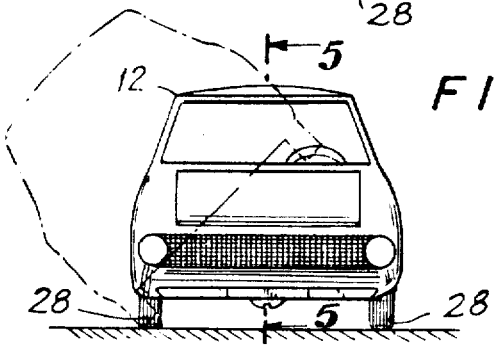
FIG. 4 is a front elevational view of a toy car supported on four wheels and showing, in phantom, the car when riding on two wheels.

The gears 36, 38, 42, 44 and 48 preferably are fabricated of a light durable material such as plastic, while the flywheel 52 is fabricated of a heavier type material such as steel. As best shown in FIG. 2, the bottom of flywheel 52 is preferably multicolored in the form of a logarithmic or Archimedean spiral, for example, and when the driving means rotates flywheel 52, a suitable attractive pattern is visible to the child. This enhances its attractiveness as a toy.

Figure 1:
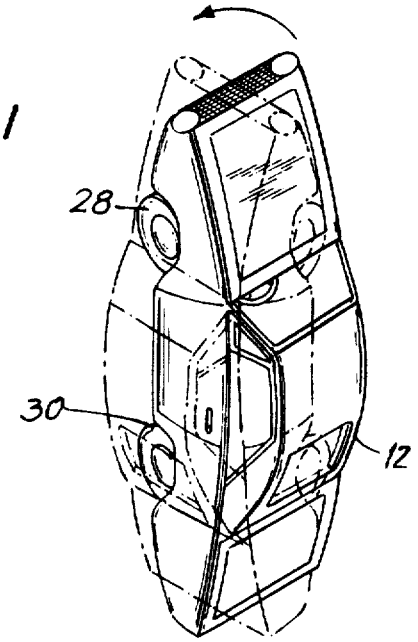
FIG. 1 is a perspective view of a toy car of the present invention rotating on its rear end.

FIGS. 1 through 4 illustrate various positions of the car when the drive wheels 30 have caused flywheel 52 to rotate at a relatively high rate of speed. In FIG. 1, the car has been placed and is shown standing on one end (rear in this case) and rotating; in FIG. 2, the car is shown moving on only its right side wheels; in FIG. 3, the car is shown moving on all four wheels; while in FIG. 4, the car is shown moving from its two-wheeled position to a four-wheeled position. Arrows in each of the figures indicate the motion sought to be illustrated by the respective figures.

Figure 8:
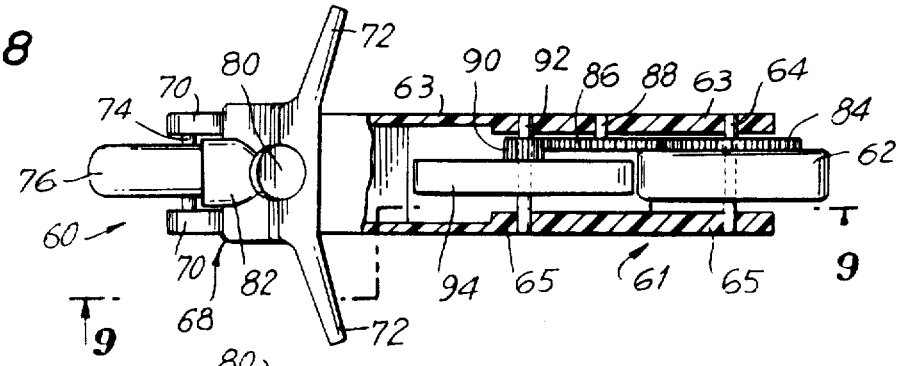
FIG. 8 is a top plan view of a motorcycle toy constructed in accordance with the principles of the present invention, partially sectioned to show the gearing arrangement and the location of the flywheel.
Figure 9:
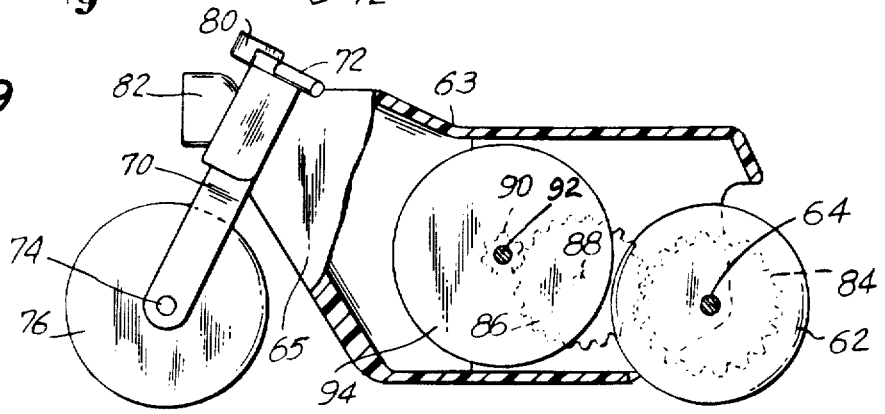
FIG. 9 is a side elevational view partially in cross section of the motorcycle toy shown in FIG. 8 taken generally along the lines 9—9 thereof.

FIGS. 8 and 9 illustrate another embodiment of the present invention in which a toy motorcycle is shown. The toy motorcycle 60 generally includes a frame 61 in the rear portion of which is mounted a gear wheel 62 on a shaft 64 rotatively mounted in the sides 63 and 65 of the frame adjacent the rear end of the motorcycle. The sides 63 and 65 may be made of a clear plastic material or side 65 may in lieu thereof be provided with a viewing window. At the forward or front end of the frame, a bifurcated member 68 is provided and the two extending arms 70 serve to rotatively retain shaft 74 supporting the front wheel 76 which freely rotates with the shaft 74. A simulated speedometer 80 is attached to the top end of the member 68 between suitable handle bars 72 extending outwardly from the top of the bifurcated member 68 while a simulated headlight 82 projects from the common throat section of the bifurcated member 68.

The drive means for the motorcycle comprises a spur gear 84 fixedly disposed about the shaft 64 and meshing with an idler gear 86 which rotates about a shaft 88 retained in one side of the body of motorcycle 60. Idler gear 86 meshes with a pinion 90 which is rotatable with a shaft 92 retained in place between the opposite sides 63 and 65 of the motorcycle frame 61. A flywheel 94 is disposed about shaft 92 and when drive wheel 62 is caused to rotate, its rotational movement is imparted to the flywheel 94. Flywheel 94 serves both as an energy storing element and as the gyroscope element for the motorcycle toy. It should be noted that the flywheel 94 is mounted vertically between the wheels 62 and 76, and that it is disposed as low as possible to the ground inasmuch as this position is significant in maintaining the vehicle in an upright position while traveling forward. Significant added stability to the toy while in motion is provided by the flywheel 94 which provides improved performance. Flywheel 94 may be fabricated of a multicolored material, and when rotated is visible to the child which enhances the toy's attractiveness.

Figure 10:
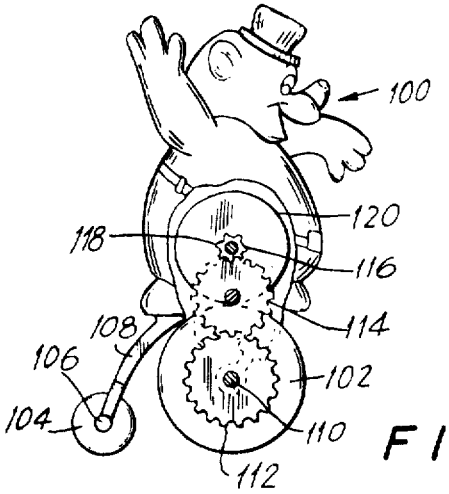
FIGS. 10, 11 and 12 are side elevational views partially in cross section to illustrate other alternate embodiments utilizing the gyroscope stabilizing element of the invention in various friction driven toys.
Figure 11:
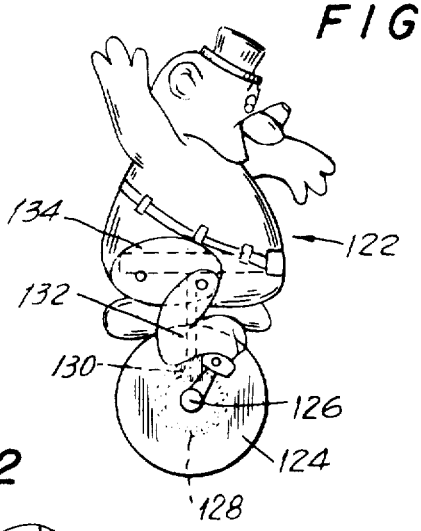

FIGS. 10 and 11 illustrate yet another embodiment of the invention wherein a two-wheeled toy bear is illustrated. As shown in FIGS. 10 and 11, the bear 100 is illustrative of only one type of animal form which could be mounted on a one- or two-wheel device. In FIG. 10, the toy 100 comprises a front wheel 102 and a rear wheel 104. Rear wheel 104 is rotatively disposed about a shaft 106 which is connected in the lower end of a downwardly extending rear strut member 108 of the body portion of the bear. The front wheel 102 is the drive wheel and rotates about a shaft 110. Driving gear 112 is fixedly disposed about shaft 110 and meshes with an idler gear 114 which in turn meshes with a pinion 116 fixedly supported about shaft 118. A flywheel 120 is also supported in a vertical plane about the shaft 118, and when the front wheel 102 is rotated, the flywheel 120 is thus also caused to rotate at a high r.p.m. When flywheel 120 is properly weighted, it serves as an effective stabilizing gyroscope enhancing the stability of the toy while in motion.

FIG. 11 illustrates an embodiment of the invention wherein a unicycle is employed. The body 122 is mounted on a single wheel 124 which is disposed about a rotatively mounted shaft 126. A crown or bevel gear 128 is also mounted about shaft 126 and meshes with a pinion gear 130 disposed about a rotatively mounted shaft 132. Flywheel 134 is also disposed horizontally about shaft 132 and serves as the stabilizing element for the toy while it is in motion.

Figure 12:
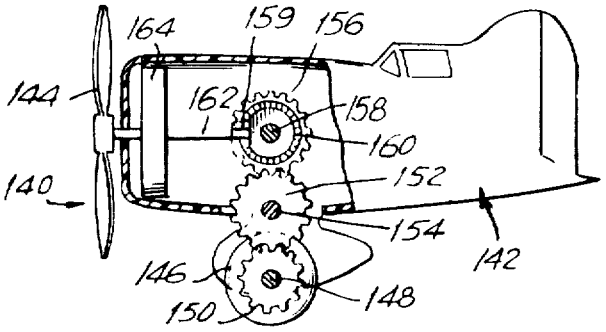

FIG. 12 is still another embodiment of a friction driven toy including a gyroscope stabilizing element, illustrating a toy plane 140. Only the front portion of the plane is shown broken away. The plane 140 comprises a main body portion 142 with a propeller 144 located in front thereof. The plane 140 further comprises conventional wheel arrangements wherein wheel 146 is illustrative of a drive wheel construction for the plane. Wheel 146 is disposed about a rotatively supported shaft 148 and a gear 150 is also fixedly secured about shaft 148. Gear 150 meshes with an idler gear 152 which is mounted about idler shaft 154. Gear 152 in turn meshes with a gear 156 which is disposed about a shaft 158. Also disposed about shaft 158 is a crown or bevel gear 160 which meshes with pinion gear 159 disposed about driven shaft 162. The propeller 144 being suitably secured, such as by pinning, to shaft 162 is thus caused to rotate upon rotation of wheel 146. In order to enhance the stability of the toy airplane, a weighted flywheel 164 is also fixedly mounted in a vertical manner about shaft 162 and when the wheel 146 is rotated, a rotational movement is imparted to flywheel 164 and to propeller 144. In this manner, the stability of the toy airplane is significantly improved which serves to make the airplane a more attractive toy.

The mass of the flywheel must be sufficient to provide adequate torque to propel the vehicle while also acting as the gyroscope for maintaining various positions in which the car or like vehicle is placed. With regard to the overall gear ratio, it is proportional to flywheel and vehicle speed. The gear ratio is thus not critical so long as adequate flywheel speed is provided to act as the propelling force and gyroscopic action. Cars may therefore have an accumulated ratio of about 5.2 to 1, whereas motorcycles may have a ratio of about 4.2 to 1.

In operation, the user or child spins the drive wheels on a flat, smooth surface so that high r.p.m. is achieved. Then, the toy is placed on the surface in any desired position and the toy, for example if a car, will maintain such position for a while after which the toy car will, if standing on one end, topple over and take off generally first on only two side wheels and thereafter on all four wheels. Such a toy car of the invention will maintain itself, for example, on two side wheels for a considerably long period of time when compared to existing prior art toys which cannot maintain motion on two side wheels for more than an instantaneous period of time. Although the gyroscope is a stabilizing element, the car is not a perfectly balanced rotor and hence the car will eventually topple over from a standing position. The many interesting maneuvers which a toy car of the invention can execute will clearly become attractive to a child and provide incentive for the child to even set up his own simulated stock car races. In a like manner, the other modified toys would also execute interesting maneuvers. It will be appreciated that although no mention was made for a viewing window in the embodiments of FIGS. 10–12, it is of course possible to provide same or make the entire body from a transparent material. In addition, the airplane embodiment could be in the form of a "pure" jet where the rotating gyroscope can be colored in such a manner to simulate swirling hot exhaust gases.

It should also be appreciated that the flywheel can be of solid construction or even of a series of flat discs stacked together to form a unitary assembly. With such a construction, it is possible to therefore have a different design on each disc. In fact, designs can be applied on both surfaces of each disc. Of course, the flywheel 52 in such cases would be readily accessible for quick and easy dismantling and reassembling of same.

As described with reference to the toy car, the gears and body of the other toys are preferably made of durable materials, such as plastic. The flywheel is preferably a balanced weighted device and may comprise a steel wheel.

While the above embodiments illustrate the principles of the present invention, it will be appreciated that numerous changes can be made in the construction and arrangement of parts without departing from the scope of the invention as defined in the following claims.

What is claimed is:

[1. A two-wheeled friction driven toy having a rotatable flywheel comprising a main body housing, and gearing means having a plurality of gears connected to at least one of said wheels constituting a drive wheel, said rotatable flywheel being disposed on a common shaft with one of said gears and providing gyroscopic action for enhancing the stability and balance of said toy, and said rotatable flywheel being disposed vertically between said two wheels of said toy.]

[2. The two-wheeled friction driven toy according to claim 1, wherein said flywheel is of a predetermined mass to provide adequate torque to propel said toy and in aiding to maintain said toy to perform maneuvers in a forward direction on said rear wheel only.]

[3. The two-wheeled friction drive toy according to claim 2 wherein said flywheel is located near the bottom of said toy in close proximity to its center of gravity.]

[4. The friction driven toy according to claim 1, including means for enabling said flywheel to be visually perceived.]

[5. The friction driven toy according to claim 4, wherein said means comprises a transparent main body housing.]

[6. The friction driven toy according to claim 4, wherein said means comprises a viewing aperture in said main body housing.]

[7. The friction driven toy according to claim 6, wherein said aperture is provided with a protective transparent window.]

[8. The friction driven toy according to claim 1, wherein said flywheel is made of a material having a greater density than the material forming said main body housing and said main body housing is made of plastic.]

[9. The friction driven toy according to claim 4, wherein at least one side of said flywheel is provided with a plurality of differently colored spirals.]

10. The friction driven toy according to claim [3] *12*, wherein said gearing means has a ratio of about 4.2 to 1.

11. A four-wheeled friction driven toy having a rotatable flywheel and front and rear pairs of wheels comprising a main body housing, and gearing means having a plurality of gears connected to said rear pair of wheels constituting drive wheels, said rotatable flywheel being disposed on a common shaft with one of said gears and providing gyroscopic action for enhancing the stability and balance of said toy, and said rotatable flywheel being disposed horizontally between said two pair of wheels of said toy; said rotatable flywheel is disposed adjacent the bottom of said toy in proximity to the toy's center of gravity, the bottom of said toy having a viewing window for observing said rotatable flywheel, and said flywheel being provided with a plurality of differently colored spirals.

*12. A two-wheeled friction driven toy comprising a main body housing, a pair of vertically disposed wheels rotatably mounted in said body housing and lying in a common vertical plane in spaced alignment with each other to define front and rear wheels; a rotatable flywheel rotatably mounted in said body housing in substantially the same vertical plane as said wheels; gearing means having a plurality of gears and being operatively connected to at least one of said wheels, said at least one wheel constituting a drive wheel, said rotatable flywheel being disposed on a common shaft with one of said gears for rotation therewith and providing gyroscopic action for enhancing the stability and balance of said toy, said front and rear wheels being spaced from each other a predetermined distance selected such that the minimum distance between the peripheries of said wheels is greater than the diameter of said flywheel; said rotatable flywheel being disposed vertically between the peripheries of said two aligned wheels of said toy entirely within the space defined by the minimum distance between said front and rear wheels, with no portion of the flywheel overlying any portion of said front and rear wheels, near the bottom of said toy in close proximity to its center of gravity and being formed of a predetermined mass, thereby to provide adequate torque to propel said toy and aid in maintaining the toy in an upright position while performing wheelie maneuvers in a forward direction on only the rearmost wheel of the toy.*

*13. The friction driven toy according to claim 12, including means for enabling said flywheel to be visually perceived.*

*14. The friction driven toy according to claim 13, wherein said means comprises a transparent main body housing.*

*15. The friction driven toy according to claim 13, wherein said means comprises a viewing aperture in said main body housing.*

*16. The friction driven toy according to claim 15, wherein said aperture is provided with a protective transparent window.*

*17. The friction driven toy according to claim 13, wherein at least one side of said flywheel visible through*

*said aperture is provided with a plurality of differently colored spirals.*

*18. The friction driven toy according to claim 12, wherein said flywheel is made of a material having a greater density than the material forming said main body housing and said main body housing is made of plastic.*

*19. The friction driven toy according to claim 12 wherein said common shaft is located in said housing at a predetermined distance from the axes of rotation of said front and rear wheels; the distance of said common shaft from the axis of rotation of the rear wheel being greater than the sum of the radiuses of the flywheel and rear wheel, and the distance of the common shaft from the front wheel being greater than the sum of the radiuses of the flywheel and the front wheel whereby the periphery of the flywheel is entirely located within the space defined by the minimum distance between the front and rear wheels of the vehicle.*

*20. A two-wheeled friction driven toy vehicle comprising a hollow main body housing, front and rear wheels rotatably mounted in said body and lying in a common vertical plane in spaced alignment with each other to respectively define front and rear wheels, a flywheel of predetermined mass rotatably mounted in said hollow body on a generally horizontal axis for rotation in a generally vertical plane, said front and rear wheels being spaced from each other a predetermined distance selected such that the minimum distance between the peripheries of said wheels is greater than the diameter of said flywheel, said flywheel being disposed vertically between the peripheries of said front and rear wheels with no portion of the flywheel overlying any portion of said front and rear wheels, entirely within the space defined by the minimum distance between said front and rear wheels as low in said body as possible and in close proximity to the center of gravity of the vehicle; and gearing means in said body operatively engaged between said flywheel and said rear wheel, said gearing means including a plurality of operatively engaged gears, one of which is drivingly engaged with said rear wheel, whereby the rear wheel constitutes a drive wheel for the vehicle, and another of which is drivingly engaged with said flywheel whereby rotation of said flywheel simultaneously provides a gyroscopic action enhancing the stability and balance of the toy vehicle while rotating said drive wheel to propel the vehicle thereby to enable the toy vehicle to move forwardly in a "wheelie" position on only its rearmost wheel.*

*21. The toy vehicle as defined in claim 20 including a shaft mounted in said housing, said flywheel being mounted on said shaft and said another gear also being mounted on said shaft for rotation with the flywheel.*

*22. The toy vehicle as defined in claim 21 wherein said shaft is located in said housing between said front and rear wheels in a predetermined position in close proximity to the center of gravity of the toy selected to position the periphery of the flywheel adjacent the bottom of said housing.*

* * * * *